United States Patent [19]

Lauer

[11] Patent Number: 5,067,365
[45] Date of Patent: Nov. 26, 1991

[54] ADJUSTING MECHANISM FOR A CONTROL MEMBER

[75] Inventor: Peter Lauer, Frankfurt am Main, Fed. Rep. of Germany

[73] Assignee: Alfred Teves GmbH, Frankfurt am Main, Fed. Rep. of Germany

[21] Appl. No.: 505,872

[22] Filed: Apr. 5, 1990

[30] Foreign Application Priority Data

Apr. 5, 1989 [DE] Fed. Rep. of Germany ....... 3910909

[51] Int. Cl.$^5$ .......................... F16C 1/10; G05G 1/14
[52] U.S. Cl. ..................................... 74/501.5 R; 74/513
[58] Field of Search ................. 74/108, 480 R, 500.5, 74/501.5 R, 512, 513

[56] References Cited

U.S. PATENT DOCUMENTS 2,672,057 3/1954 Bratz .............................. 74/500.5 X
4,962,823 10/1990 Luft et al. ......................... 74/513 X

FOREIGN PATENT DOCUMENTS 68032 3/1958 France ................................. 74/513
0642427 9/1950 United Kingdom ............... 74/500.5

Primary Examiner—Allan D. Herrmann
Assistant Examiner—David W. Laub
Attorney, Agent, or Firm—Robert P. Seitter; J. Gordon Lewis

[57] ABSTRACT

An adjusting mechanism for a control member for influencing automotive vehicle engine torques. A spring-supported actuating member is articulated via pulleys at a mechanical linkage. The mechanical linkage transmits the movement of the actuating member onto a control member. The control member is influenced irrespective of the activation of the actuating member by another control variable effective, in particular, by the slip effect of driven vehicle wheels. A functionally optimized mechanical linkage is provided which has no reactive effect on the actuating member. This linkage comprises a first cable connecting link and a second cable connecting link, with the second mechanical connecting link cooperating with the control member via a pair of pulleys which are arranged on a lever and partially wrapped by the second cable connecting link.

16 Claims, 1 Drawing Sheet

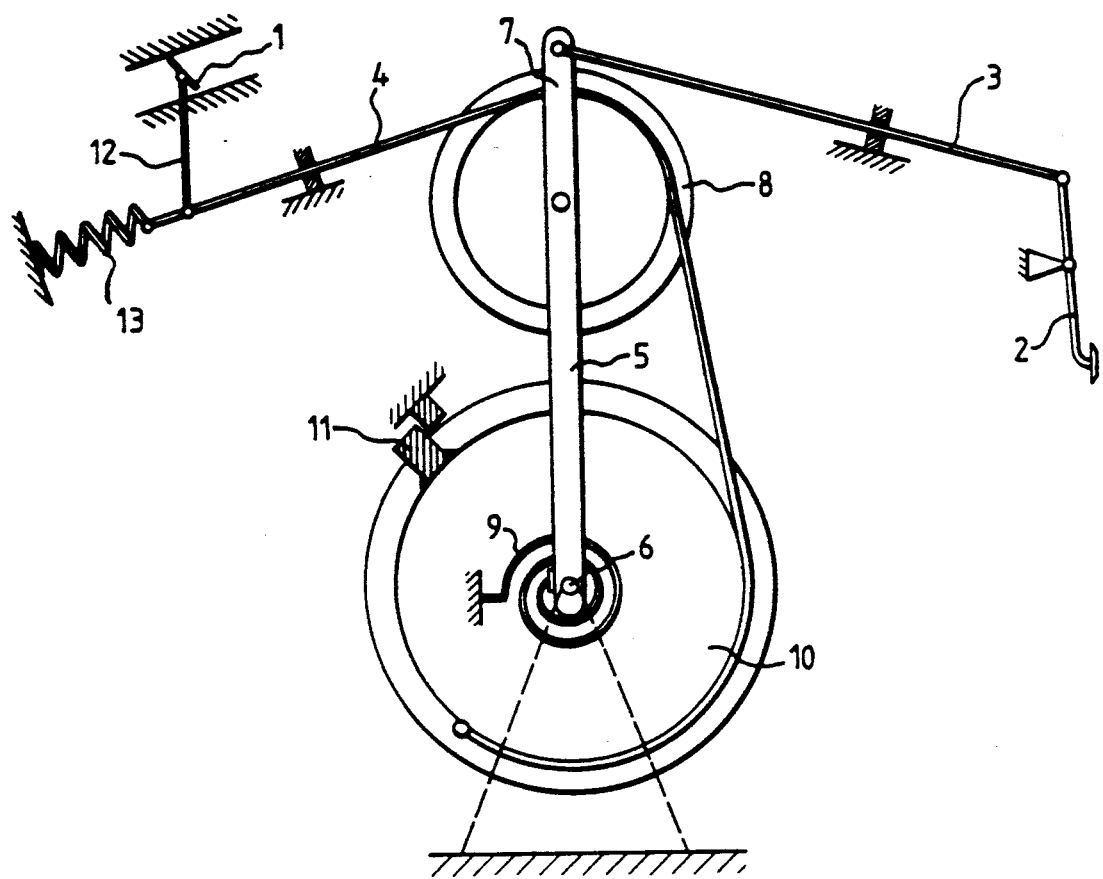

ADJUSTING MECHANISM FOR A CONTROL MEMBER

TECHNICAL FIELD

The present invention relates to an adjusting mechanism for a control member, in particular, for influencing automotive vehicle engine torques.

BACKGROUND ART

A similar adjusting mechanism is already known from DE-OS 36 28 456. In this adjusting mechanism, the mechanical link is composed of a Bowden cable with a toothed belt integrated by sectors and guided between a deflection pulley, an input wheel and a set wheel. An electromagnetically excited adjusting means adjusts the set wheel so that the effective length varies by the variation of the toothed belt deflection, whereby the length-variable adjustment of the mechanical link causes modification of the throttle valve aperture angle in dependence on the pedal position.

A disadvantage of this arrangement is that during traction slip control the reactive effect of the control action on the pedal cannot be totally prevented. Furthermore, a particular shortcoming of this arrangement is that, while taking into consideration a simple and functionally reliable design with increasing number of interposed guide wheels and set wheels used, there is a considerable increase in fatigue under reversed bending stresses, in particular when wire ropes are used, as well as an increase in losses due to friction and an augmented tendency of the wheels to clamp.

SUMMARY OF THE INVENTION

Hence, it is an object of this invention to devise an adjusting mechanism which ensures a functionally optimized as well as deceleration-minimized control, while low-cost and simple individual component parts are used and the above-mentioned shortcomings are eliminated.

Thus, an adjusting mechanism is provided which during traction slip control and/or engine stall torque control prevents reaction on the pedal in a simple fashion and, at the same time, provides for an almost unimpaired response behavior for the purpose of attaining a decelerationless control.

A preferred embodiment of the present invention has the deflection pulley arranged to be pivoted in the lever so that during the tilting movement of the lever no relative movement affected with friction has to be transmitted between the second connecting link and the deflection pulley. As a result, there remains merely a small-surface bearing area on the axis of rotation of the deflection pulley which surface is minimized in respect of friction.

In order to reduce the necessary space requirement, the present invention has the torsion spring arranged as a spiral spring which is attached between the lever and the regulator pulley.

Further features, advantages and possible application of the present invention can be gathered from the following description of a preferred embodiment.

BRIEF DESCRIPTION OF THE DRAWING

The drawings schematically illustrate an adjusting mechanism embodying the present invention.

DETAILED DESCRIPTION OF THE INVENTION

The drawing shows, in a schematic sketch, the inventive adjusting mechanism composed of a connecting link 3 and a second mechanical connecting link 4 which permit a mechanical transmission between an actuating member 2 and a control member 1 indirectly through a lever 5 with a regulator pulley 10 and a deflection pulley 8. Both the regulator pulley 10 and an intermediate member 12 associated with the control member 1 are acted upon by spring force.

In the event of manual activation of the actuating member 2 which normally is the accelerator pedal, the actuating member swivels around its stationary point of support and transmits this movement onto the first deflectable and flexible connecting link 3 which is articulated at the actuating member 2 and is preferably designed as a Bowden cable. In consequence thereof, under the effect of tensile force of the first mechanical connecting link 3, the lever 5, too, swivels about its stationary axis of rotation 6 to the right in the drawing. The axis of rotation 5 arranged in the area of the a torsion spring 9, preferably in the form of a spiral spring. This deflection of the lever 5 is followed by a deflection in the same direction of the second connecting link 4 which is guided on the lever 5 via deflection pulley 8 so that the intermediate member 12 fastened to the second connecting link 4 performs a synchronous movement in the same direction. To accomplish tightening and resetting of the second connecting link 4, which is preferably designed as a Bowden cable, in consequence of the release of the accelerator pedal, the end of the second Bowden cable which is connected to the intermediate member 12 is biased by means of a tension spring 13. The opposed second end of cable 4 is fixed at the regulator pulley 10. The minimum force of the torsion spring 9 is at least as large as, and oppositely directed to, the maximum tension force of the tension spring 13. The regulator pulley 10 is kept in its inactive position on its stop 11 by the action of the torsion spring 9 that is attached to the regulator pulley 10 and the lever 5.

Flexible connecting links 3 and 4 may be steel wire or stranded nylon wire.

Upon commencement of the traction slip control operation, a preferably electronically controlled servo motor, which is not shown in the drawing, ensures that the adjusting movement of the accelerator pedal is superimposed by the twisting of the regulator pulley 10 on the lever 5 so that there is effected a change in the throttle valve aperture angle and hence an intervention without reaction on the accelerator pedal and superimposed on the introduced manual movement, what results in influencing the engine torque governed by way of the accelerator pedal.

What is claimed is:

1. An adjusting mechanism for a control member which influences automotive vehicle engine torques, said mechanism comprising:
   an actuating member;
   a control member;
   a first pulley;
   a second pulley;
   a lever extending between the rotation axes of said first and said second pulleys;
   a first connecting link coupled between said actuating member and said lever;

and a second connecting link coupled between said control member and said second pulley and wrapped around portions of said first and said second pulleys.

2. An adjusting mechanism according to claim 1 wherein a first end of said first connecting link is coupled to said actuating member and a second end of said first connecting link is coupled to said lever.

3. An adjusting mechanism according to claim 2 wherein said first connecting link is connected to an end of said lever and said lever is pivotable about the rotation axis of said second pulley.

4. An adjusting mechanism according to claim 3 wherein said first pulley is mounted for rotation on said lever between said end of said lever and said second pulley.

5. An adjusting mechanism according to claim 4 wherein said second connecting link is wrapped around a portion of said first pulley to effect rotation thereof in a direction opposite to pivotal movement of said lever.

6. An adjusting mechanism according to claim 5 further including a torsion spring positioned in proximity to the rotation axis of said second pulley and having a first end attached to said lever and a second end attached to said second pulley.

7. An adjusting mechanism according to claim 5 wherein said second pulley is rotatable irrespective of the direction of pivotable movement of said lever.

8. An adjusting mechanism according to claim 7 further including means for limiting rotational movement of said second pulley urged by said torsion spring.

9. An adjusting mechanism according to claim 8 wherein said means for limiting rotational movement include a stop member attached to the circumference of said second pulley.

10. An adjusting mechanism according to claim 8 further including an intermediate member connected between said control member and said second connecting link.

11. An adjusting mechanism according to claim 10 further including a second spring connected to a first end of said second connecting link and wherein said intermediate member is connected to said first end of said second connecting link.

12. An adjusting mechanism according to claim 11 wherein said second spring is a tension spring.

13. Ad adjusting mechanism according to claim 12 wherein said torsion spring is operative to cooperate with said second pulley to apply a tensile force to said second connecting link tat at all times equals or exceeds an oppositely directed tensile force applied to said second connecting link by said tension spring.

14. An adjusting mechanism according to claim 13 wherein said second connecting link is a steel wire.

15. An adjusting mechanism according to claim 13 where said second connecting link is a stranded nylon wire.

16. An adjusting mechanism according to claim 6 wherein said torsion spring is a spiral spring.

* * * * *